ROBERT C. JAKLEVIC
JOHN J. LAMBE
JAMES E. MERCEREAU
ARNOLD H. SILVER
INVENTORS

BY John R. Faulkner
Thomas H. Oster
ATTORNEYS

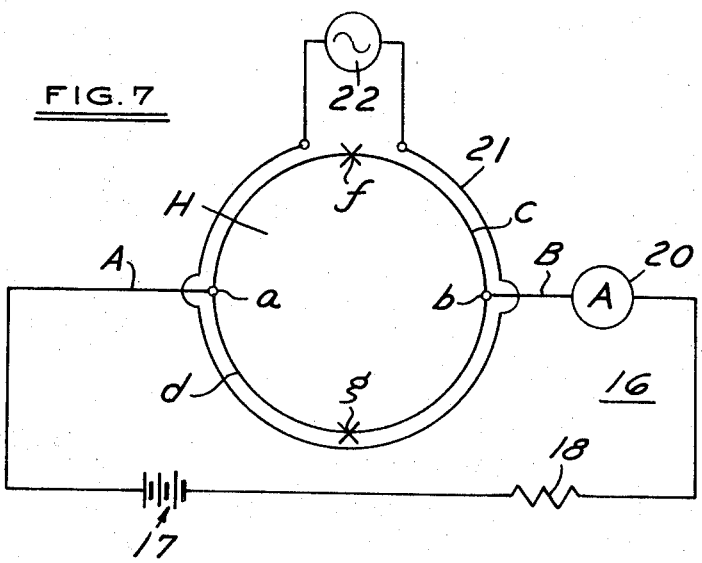
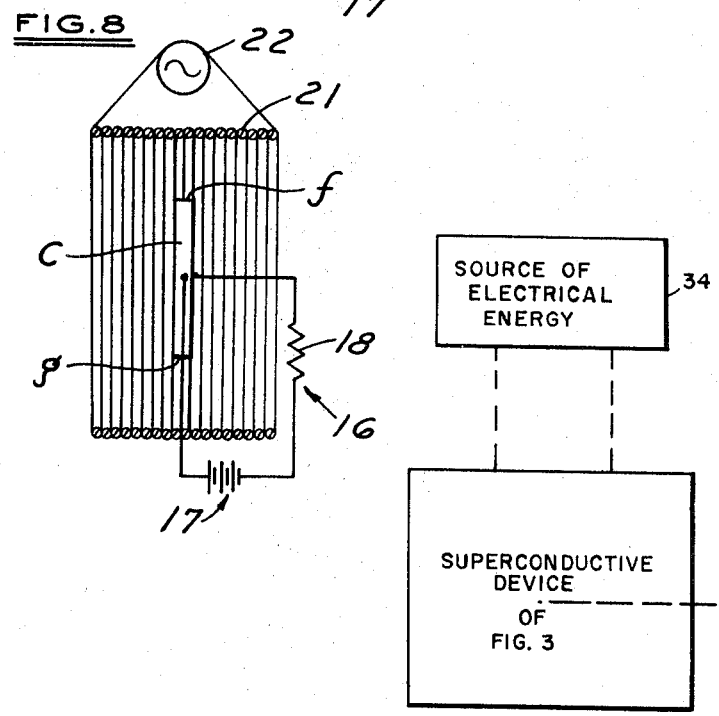
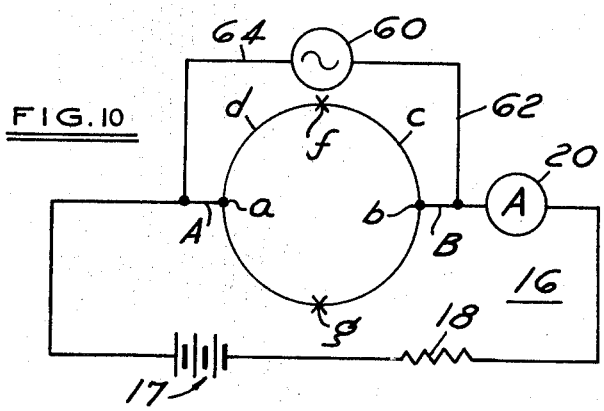

United States Patent Office 3,533,018
Patented Oct. 6, 1970

3,533,018
QUANTUM WAVE CURRENT CONTROL
IN SUPER-CONDUCTORS
Robert C. Jaklevic and John J. Lambe, Birmingham,
James E. Mercereau, Dearborn, and Arnold H. Silver,
Farmington, Mich., assignors to Ford Motor Company,
Dearborn, Mich., a corporation of Delaware
Filed Feb. 16, 1965, Ser. No. 433,010
The portion of the term of the patent subsequent
to Jan. 8, 1985, has been disclaimed
Int. Cl. H03k *3/38;* H03c *1/14*
U.S. Cl. 332—52                       8 Claims

ABSTRACT OF THE DISCLOSURE

A process, system and apparatus for the control or modulation of electric currents in solid super-conductors. This process is carried out by creating a relative phase displacement between at least two currents flowing through a super-conductor and combining these two currents after phase displacement has been achieved to obtain control or modulation of the current.

---

This invention is concerned with a process, system and apparatus for the control or modulation of electric currents in solid super-conductors. This invention is based upon the universal quantum wave properties of current carrying electrons in solids. Interference techniques operable upon all wave phenomena are employed to control or modulate the flow of electrons in a current carrying super-conductor. This invention is carried out by causing a relative phase displacement between at least two currents flowing through a super-conductor and combining these two currents after phase displacement has been achieved to obtain control or modulation of the current.

When two or more waves are brought together and caused to combine, the amplitude of the resulting wave depends upon the relative phase and amplitude of the combining waves. For the sake of clarity this discussion will be limited to the case of combining only two waves and that these waves be of the same original amplitude. It is to be recognized that this is only a very special case and the same logic and principles can be apppplied to the combination of any desired number of waves of any desired relative phase and amplitude.

In the event the two waves mentioned above combine "in phase" the amplitude of the resulting wave is larger than either of the initial waves. Similarly if the waves combine "out of phase" the resulting wave may have a zero amplitude. These two situations are the two extreme cases and all intermediate situations are possible with an intermediate amplitude and a corresponding shift in phase.

This situation may be described mathematically in connection with FIG. 1 which is a purely schematic showing of a super-conductive current path comprising two essentially parallel electrical paths.

FIG. 7 is a circuit diagram of a means for carrying out one of the methods of the present invention.

FIG. 8 is a side sectional view partially in elevation of the circuit shown in FIG. 7.

FIG. 9 is a schematic view of a means for carrying out another of the methods of the present invention.

FIG. 10 is a circuit diagram of a means for carrying out another of the methods of the present invention.

Figure 1:
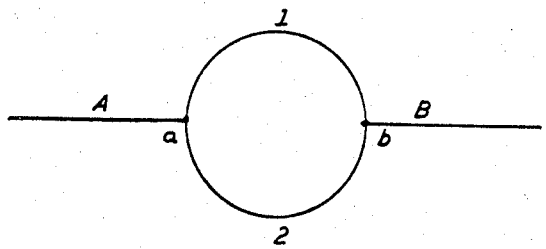

With reference to FIG. 1, a wave (electrical current or electron flow) is caused to flow down path A and at ($a$) splits into two waves which flows along super-conductive paths 1 and 2 and are combined at ($b$). The phase change gamme ($\gamma_1$) of the wave of wave length lambda ($\lambda$) along path 1 is defined as $$\gamma_1 = 2\pi \int_1 \frac{dl}{\lambda} \tag{1}$$

Similarly the phase change $\gamma_2$ of the wave of wave length along the path 2 is defined as $$\gamma_2 = 2\pi \int_2 \frac{dl}{\lambda} \tag{2}$$

The difference in phase at the point of juncture of the two waves approaching along paths 1 and 2 is denoted $\Delta\gamma$ and may be defined by the expression $$\Delta\gamma = 2\pi \left[ \int_1 \frac{dl}{\lambda} - \int_2 \frac{dl}{\lambda} \right] \tag{3}$$

Expression 3 is obtained by subtracting Equation 2 from Equation 1 and may be replaced by its full mathematical expression $$\Delta\gamma = 2\pi \oint \frac{dl}{\lambda} \tag{4}$$

where the line integral is taken around the combined paths 1, 2. The wave travelling along each of these paths also oscillates in time with a frequency nu ($\nu$) and the phase has also progressed with time as defined by the expression $$2\pi \int \nu dt \tag{5}$$

Thus the total phase difference is $$\Delta\gamma = 2\pi \left[ \oint \frac{dl}{\lambda} + \int_1 \nu dt - \int_2 \nu dt \right] \tag{6}$$

The amplitude (I) of the wave resulting from the combination of the two waves from paths 1 and 2 must depend upon $\cos \Delta\gamma$. Thus $$I = I_0 \cos 2\pi \left[ \oint \frac{dl}{\lambda} + \int_1 \nu dt - \int_2 \nu dt \right] \tag{7}$$

This discussion has been concerned only with pure wave properties and it should apply generally to any wave form. We are here particularly interested in the application to the Quantum waves or the de Broyle waves associated with particles. Specifically the wave length $\lambda$ is associated with the momentum $p$ by the expression.

$$\frac{1}{\lambda} = \frac{p}{h} \tag{8}$$

where $h$ is Planck's constant. Similarly the frequency is associated with energy (E) by the expression $$\nu = \frac{E}{h} \tag{9}$$

For the de Broyle waves then $$I = I_0 \cos \frac{1}{h} \left[ \oint p \, dl + \int_1 E \, dt - \int_2 E \, dt \right] \tag{10}$$

where the amplitude I is now the current strength. Thus a control of the current I is possible through the modulation applied to $\oint p\,dl$ or $\int E\,dt$.

Such a modulation is a pure "Quantum" effect and is not to be predicted from a classical view of matter.

This becomes apparent when it is considered that any normally conductive wire arranged as shown in FIG. 1 certainly does not exhibit such a modulation effect. In such a conductor the Quantum waves are scattered frequently in the normally conductive wire giving rise to the normal resistance of the wire and causing a smearing of the quantum effect into unobservable chaos. Only in a super-conductor where there is no resistance and no phase destroying scattering can the Quantum effect be observed. However, the nature of a super-conductor is such that the summation of the energies in path 1 and path 2 are identical in the absence of resistance. This is expressed mathematically as $$\int_1 E dt = \int_2 E dt \quad (11)$$

and $$\oint p dl = Nh = \text{a constant number} \quad (12)$$

From this it follows that I equals $I_0$ and no modulation is possible.

Figure 2:
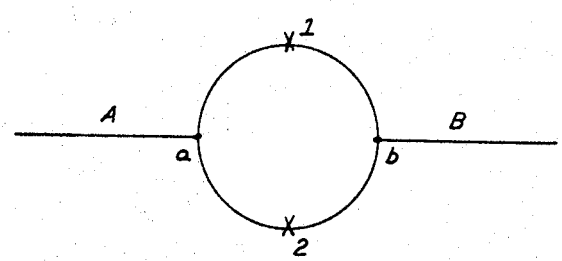
FIG. 2 is a similar schematic showing with a junction in each branch.

The modulation of electron flow or electrical current has been made possible by the insertion of a junction or junctions in the circuit originally depicted in FIG. 1 as shown in FIG. 2. FIG. 2 is identical to FIG. 1 except that junctions represented by the symbol X have been inserted into path 1 and path 2. These junctions are constructed so as to permit the passage of super-currents and to simultaneously permit expression (12) to be modified as follows $$\oint p dl \neq Nh \quad (13)$$

Under these circumstances an energy difference ($\Delta E$) must develop across either or both junctions (X) and the resultant super-current will be $$I = I_0 \cos \frac{1}{\hbar} \left[ \oint p dl - \int \Delta E dt \right] \quad (14)$$

The cannonical momentum ($p$) is composed of a mechanical momentum (MV) and an electromagnetic component ($eA$). If the energy represented by $\Delta E$ is assumed but not restricted to be associated with a voltage (v.), then the current may be written in full as follows $$I = I_0 \cos \frac{1}{\hbar} \left[ \oint m v dl + e \oint A de - e \int v dt \right] \quad (15)$$

The expression $\oint A dl$ is defined as the magnetic flux ($\phi$). From expression (15) it follows that current is explicitly seen to be modulated by (1) a particle velocity ($v$)
(2) a magnetic flux ($\phi$)
(3) a voltage (v.)

Modulation by each of these techniques has been observed in laboratory demonstrations. The junctions (X) employed in these demonstrations have included typical Josephson junctions which are essentially a thin insulating film barrier as well as a junction formed by a very narrow super-conducting link.

The second term within the brackets in expression (15) may also be written as $e\phi$ and the expression (15) so requires that modulation of the super-current be obtainable by variation of the magnetic flux across the junction or junctions. Precisely this effect has been obtained experimentally using the interferometer shown schematically in FIG. 2.

Figure 3:
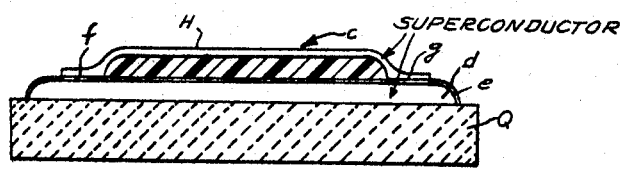
FIG. 3 is an enlarged section of a specific type of junction structure.

The interferometer shown in section in FIG. 3 was fabricated by evaporating a thin layer of tin ($d$) about 1000 angstroms thick upon a quartz substrate (Q). The surface of this tin layer was oxidized in a gently heated oxygen atmosphere to produce a layer $e$ of tin oxide upon tin layer $d$. The central portion of tin layer $d$ was covered with a suitable insulating coating. In this case a coating known commercially as "Formvar" was employed. The "Formvar" layer has been designated H. A second tin layer $c$ was now evaporated over "Formvar" layer H and oxidized tin layer $d$. The two tin layers $c$ and $d$ form the two arms 1 and 2 of the device shown in FIG. 2. Current is fed through this device by wires attached to films $c$ and $d$. The tin oxide layers at $f$ and $g$ act as the junctions (X).

This device was cooled in liquid helium to render the tin super-conductive and the device was then subjected to a varying magnetic flux. When the maximum super-current permitted through this device is graphed against the flux density, the curve obtained is that represented by FIG. 4. This graph clearly shows the flux period of $$h/e = 2.07 \times 10^{-7} \text{ gauss/cm.}^2$$

Figure 4:
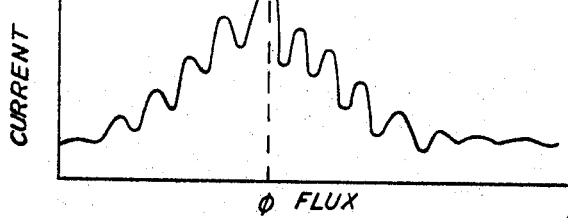
FIG. 4 is a graph of magnetic flux aginst maximum super-current.

This flux period appears to be perfectly general and is common to all super-conductors which have been tested. The overall amplitude modulation of the super-current arises from a diffraction effect associated with the junctions themselves and is irrelevant to the establishment of the interference effect. The particular wave form displayed in FIG. 4 is attributable to the characteristics of the particular experimental apparatus employed and is by no means to be construed as a limitation upon the type of modulation obtainable by this technique.

The first term enclosed in the brackets in expression (15) involves a velocity term and dictates that current modulation by means of velocity must be possible. The velocity modulation for a rotation ($\omega$) reduces to $$\frac{2m}{\hbar} A \omega$$

upon evaluating the integral Expression (15) is thus an explicit function of the angular velocity $\omega$ and a periodic super-current modulation is expected as a function of the angular rotation rate similar to that described above with reference to flux modulation. Complete experimental confirmation has been obtained of this prediction. The interferometer depicted in FIG. 3 was rotated about an axis perpendicular to area H. The predicted periodic modulation of super-currents introduced into this interferometer was obtained.

The final term within the brackets of expression (15) dictates that a time dependent modulation of current due to a voltage be obtainable. If an alternating voltage of frequency $\omega$ is impressed and is of the form $$V_0 \sin \omega t$$

the super-current of this frequency may be calculated to be of the form $$I = I_0 J_1 \left( \frac{eV_0}{\hbar \omega} \right)$$

where $J_1$ is a Bessel function. This prediction has also received complete experimental confirmation.

Figure 5:
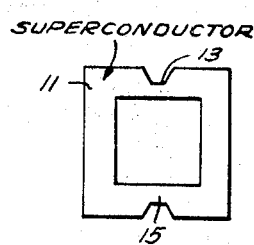
FIG. 5 is a schematic showing of a further type of junction.

An interferometer was fabricated by evaporating a tin film 11 about 1000 angstroms thick upon a quartz substrate. This evaporated tin film was then sculptured into the form shown in plan in FIG. 5. The reduced sections 13 and 15 of the tin layer form junctions (X) when driven from the super-conductive state to the normal state by an impressed current. The dimensions of the reduced sections 13 and 15 of the tin layer were 10 microns in length, 10 microns in width and 1000 angstroms in thickness.

This interferometer was chilled to the super-conductive temperature region and placed in the cavity of a microwave apparatus. Here the microwaves induced super-currents through the interferometer. When these induced currents attain a sufficiently large value they induce a breakdown of the thin sections to create junctions (X). Interference now occurs with the super-currents being modulated by the microwave voltage appearing across the junctions.

Figure 6:
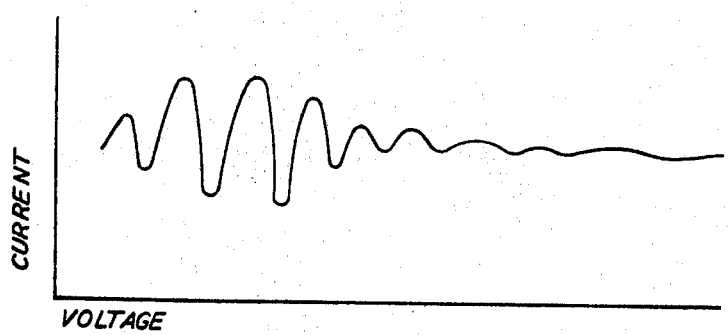
FIG. 6 is a graph of voltage against super-current where voltage is employed to modulate the super-current.

A graph of current against voltage obtained in this manner is shown in FIG. 6 and is typical of a Bessel function.

The junctions described above have been either a thin layer of insulating material (tin oxide) or a very thin connecting link separating two super-conducting masses. These are by no means the only types of junctions possible. The thin connecting link type of junction may be expanded to include any very minute connection between super-conducting masses. For example, the type of contact obtained by pressing a pointed screw against a super-conducting mass has been operated in this manner. It is not essential that the minute connecting link be a super-conductive material. Any moderately conducting material will function. Theoretical considerations dictate that no actual contact is necessary but only that the two superconductors be separated by a very minute space of the order of ten angstroms. Experimental difficulties have precluded actual use of this approach to date.

As will be readily apparent to those skilled in the art, the modulation of the supercurrent by a variation of magnetic flux across the junction or junctions as described above may be accomplished by any suitable circuit means known to those skilled in the art. An example of such a circuit is shown in FIGS. 7 and 8. While this circuit is described in connection with the junction structure shown in FIG. 3, it may be used with equal facility to modulate the supercurrent in the junction structure shown in FIG. 5.

The junctions $f$ and $g$ and the superconducting elements $c$ and $d$ are formed in the loop or ring that encloses the space H as described in relationship to FIG. 3. The superconductive elements $c$ and $d$ are connected to an external circuit 16 that includes a source of electrical energy 17 and a resistor 18 for limiting current flow. The source of electrical energy 17 provides a means for causing current flow through the superconducting elements $c$ and $d$ and through the junctions $f$ and $g$. A current measuring device 20 is shown that is used to measure this dissipationless current flow.

Means are provided to establish a magnetic field within the space H enclosed by the junctions $f$ and $g$ and the superconductive elements $c$ and $d$. This means may take the form of a coil 21 that is connected to a source of electrical energy 22, preferably an alternating source of electrical energy which is capable of producing a time varying output. It is preferred that the flux or magnetic field in the space H be perpendicular to the plane of the loop or ring formed by the junctions $f$ and $g$ and the superconductive elements $c$ and $d$. To accomplish this end, the axis of the coil 21 should be made parallel to the axis of the loop. One means for doing this is shown in FIG. 8 in which the coil 21 surrounds the loop composed of the two junctions $f$ and $g$ and the superconducting elements $c$ and $d$. It is apparent that this coil is positioned to direct a magnetic field which may be of a time varying nature due to the source 22 through the loop in a direction substantially perpendicular to the plane of the loop. This circuit will then cause a modulation of the supercurrent flowing in the superconductive elements $c$ and $d$ by variation of magnetic flux produced by the time varying electrical energy supplied to the coil 21 from the source 22.

As stated above, the interferometer depicted in FIG. 3 was rotated about an axis perpendicular to area H and the predicted periodic modulation of supercurrents introduced into this interferometer was obtained. As would be apparent to those skilled in the art, any suitable means for rotating the interferometer will suffice. FIG. 9 shows an example of one of these means for rotating the junction structure shown in FIG. 3 about an axis perpendicular to the area H. The rotation of the junction structure shown in FIG. 3 about this axis results in periodic modulation of supercurrents into the structure as pointed out above. While FIG. 9 discloses rotating the junction structure of FIG. 3 about an axis perpendicular to area H, it should be realized that the structure shown in these figures may be used to rotate the junction structure shown in FIG. 5 about an axis perpendicular to the superconductor material 11.

In FIG. 9 there is shown an electric motor 30 which may be suitably connected to a source of electrical energy (not shown), and may be of the variable speed type. The electric motor 30 has a rotor or armature shaft 32 connected to the superconductive device of FIG. 3 or FIG. 5 in any suitable manner. As pointed out above, the rotor or armature shaft may be connected to rotate the superconductive device of FIG. 3 about an axis perpendicular to the area H. A source of electrical energy 34, which may comprise the battery 17 and the resistor 18, as shown in FIG. 7, is connected to the superconductive device in any suitable manner as will be readily apparent to those skilled in the art.

When the electric motor 30 is energized, the rotor or armature shaft 32 will rotate the superconductive device. This accomplishes the rotation of the superconductive device with the resultant periodic modulation of the supercurrents flowing through the superconductors of the device. This accomplishes the rotation of the superconduc-electrical energy 34.

It has been stated above that the final term within the brackets of expression (15) dictates that a time dependent modulation of current be obtainable and that if an alternating voltage of frequency $\omega$ is impressed on the superconductors and is of the form $V_0 \sin \omega t$ the supercurrent of this frequency may be calculated to be of a certain form $$I = I_0 J_1 \left( \frac{eV_0}{\hbar \omega} \right)$$

where $J_1$ is a Bessel function. It has also been stated above that this prediction has received complete experimental confirmation. FIG. 10 is an example of a circuit which would be readily apparent to those skilled in the art from the above discussion for providing a time dependent modulation of supercurrents due to a voltage as dictated by the final term within the brackets of expression (15). The junction structure shown in FIG. 3 has been illustrated diagrammatically with leads A and B connected to superconductors $d$ and $c$, respectively, at the points $a$ and $b$. The leads A and B are connected in series with a circuit as shown in FIG. 7 comprising the source of electrical energy 17, resistor 18 and ammeter 20. Also connected to leads A and B is a source of alternating voltage 60 with one terminal being connected to lead A by lead 64 and with the other terminal being connected to lead B through a lead 62. The source of alternating voltage may be of the form as expressed above $V_0 \sin \omega t$. As a result of the impression of this alternating voltage in the superconductors $d$ and $e$, the supercurrents flowing in superconductors $d$ and $e$, as a result of the current flowing in the series circuit including source of electrical energy 17, resistor 18, ammeter 20, lead B, superconductor $c$, junctions $f$ and $g$, superconductor $d$, and lead A, is modulated due to this voltage and is of the form expressed above.

The examples described in connection with this invention have related to the use of two paths for the supercurrents. It is to be clearly understood that this is illustrative in nature only. Any desired number of super-current paths may be employed without departing from the scope of the invention.

We claim as our invention:

1. The process of modulating an electric current comprising dividing the electric current into portions, flowing the electric current through at least two electrically parallel super-conductive paths, creating a relative phase shift of the quantum waves associated with the electrons involved in the electric current and reuniting the portions after the relative phase shift has taken place whereby the original electric current is modulated.

2. The process of modulating an electric current comprising dividing the electric current into portions, flowing the electric current through at least two elecrically parallel super-conductive paths, creating a relative phase shift of the quantum waves associated with the electrons involved in the electric current by flowing the electric current through at least one junction and reuniting the portions after the relative phase shift has taken place whereby the original electric current is modulated.

3. The process of modulating an electric current comprising dividing the electric current into portions, flowing the electric current through at least two electrically parallel super-conductive paths, creating a relative phase shift of the quantum waves associated with the electrons involved in the electric current by flowing the electric current through at least one junction and simultaneously impressing a magnetic field on the super-conductive paths and reuniting the portions after the relative phase shift has taken place whereby the electric current is modulated.

4. The process of modulating an electric current comprising dividing the electric current into portions, flowing the electric current through at least two electrically parallel super-conductive paths, creating a relative phase shift of the quantum waves associated with the electrons involved in the electric current by flowing the electric current through at least one junction and simultaneously impressing a rotational movement on the super-conductive paths and reuniting the portions after the relative phase shift has taken place whereby the electric current is modulated.

5. The process of modulating an electric current comprising dividing the electric current into portions, flowing the electric current through at least two electrically parallel super-conductive paths, creating a relative phase shift of the quantum waves associated with the electrons involved in the electric current by flowing the electric current through at least one junction and simultaneously impressing a voltage on the super-conductive paths and reuniting the portions after the relative phase shift has taken place whereby the electric current is modulated.

6. The process recited in claim 3 in which flow of the current through the junction includes flow of the current through an element selected from the class consisting of thin insulating layers and contacts of very small area.

7. The process recited in claim 4 in which the flow of the current through the junction includes flow of the current through an element selected from the class conisisting of thin insulating layers and contacts of a very small area.

8. The process recited in claim 5 in which the flow of the current through the junction includes flow of the current through an element selected from the class consisting of thin insulating layers and contacts of a very small area.

References Cited

UNITED STATES PATENTS

| | | |
|---|---|---|
| 3,025,416 | 3/1962 | Johnson. |
| 3,281,609 | 10/1966 | Rowell. |
| 3,363,200 | 1/1968 | Jaklevic et al. _____ 332—52 X |

OTHER REFERENCES

Merriam—IBM Technical Disclosure Bulletin "High Speed Cryogenic Logic Element Based on the Josephson Tunneling Effect"—vol. 7, No. 3, p. 271, August 1964.

Josephson—Physics Letters: "Possible New Effects in Superconductive Tunneling," vol. 1, No. 7, pp. 251–253, July 1, 1962.

ALFRED L. BRODY, Primary Examiner

U.S. Cl. X.R.

307—245, 306; 317—234